(12) United States Patent
Maufer

(10) Patent No.: US 7,558,873 B1
(45) Date of Patent: Jul. 7, 2009

(54) METHOD FOR COMPRESSED LARGE SEND

(75) Inventor: Thomas Albert Maufer, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 526 days.

(21) Appl. No.: 10/141,039

(22) Filed: May 8, 2002

(51) Int. Cl.
G06F 15/16 (2006.01)

(52) U.S. Cl. ............... 709/237; 709/203; 709/220; 709/223; 709/230

(58) Field of Classification Search ......... 709/237, 709/201, 204, 217, 227, 228, 230, 231, 246, 709/203, 220, 223
See application file for complete search history.

(56) References Cited

U.S. PATENT DOCUMENTS

| | | | |
|---|---|---|---|
| 5,742,773 A | 4/1998 | Blomfield-Brown et al. | |
| 5,826,027 A | 10/1998 | Pedersen et al. | |
| 5,884,025 A | 3/1999 | Baehr et al. | |
| 6,032,253 A | 2/2000 | Cashman et al. | |
| 6,047,325 A | 4/2000 | Jain et al. | |
| 6,055,236 A | 4/2000 | Nessett et al. | |
| 6,094,485 A | 7/2000 | Weinstein et al. | |
| 6,101,170 A | 8/2000 | Doherty et al. | |
| 6,141,705 A * | 10/2000 | Anand et al. | 710/15 |
| 6,189,102 B1 | 2/2001 | Beser | |
| 6,215,907 B1 * | 4/2001 | Kumar et al. | 382/240 |
| 6,275,588 B1 * | 8/2001 | Videcrantz et al. | 380/255 |
| 6,304,573 B1 * | 10/2001 | Hicks, III | 370/401 |
| 6,327,660 B1 | 12/2001 | Patel | |
| 6,389,419 B1 | 5/2002 | Wong et al. | |
| 6,449,647 B1 | 9/2002 | Colby et al. | |
| 6,496,867 B1 | 12/2002 | Beser et al. | |
| 6,542,935 B1 | 4/2003 | Ishii et al. | |
| 6,542,992 B1 | 4/2003 | Peirce, Jr. et al. | |
| 6,615,357 B1 | 9/2003 | Boden et al. | |
| 6,629,150 B1 * | 9/2003 | Huded | 709/247 |
| 6,646,999 B1 | 11/2003 | Kato et al. | |
| 6,647,428 B1 * | 11/2003 | Bannai et al. | 709/245 |
| 6,658,463 B1 * | 12/2003 | Dillon et al. | 709/219 |

(Continued)

FOREIGN PATENT DOCUMENTS

EP 1130846 9/2001

(Continued)

OTHER PUBLICATIONS

"Ciscopress.com IPSec Overview Part Four: Internet Key Exchange (IKE)", Andrew Mason, Feb. 22, 2002.*

(Continued)

Primary Examiner—Kenny S Lin
Assistant Examiner—Lan-Dai T Truong
(74) Attorney, Agent, or Firm—Patterson & Sheridan, LLP

(57) ABSTRACT

Method for Internet Protocol Payload Compression (IPComp) and Large Send is described. More particularly, a Large Send initiated by a computer is used to trigger an IPComp negotiation. After agreement on IPComp, data blocks for such a Large Send are compressed in accordance with an agreed upon compression algorithm prior to being divided up into smaller blocks, such as being divided by a maximum transmission unit, for sending. To further improve performance, a intelligent network interface with Large Send and IPComp capabilities is used for offloading Large Send and IPComp functions.

16 Claims, 3 Drawing Sheets

U.S. PATENT DOCUMENTS

| | | | |
|---|---|---|---|
| 6,704,794 | B1 | 3/2004 | Kejriwal et al. |
| 6,714,985 | B1 | 3/2004 | Malagrino et al. |
| 6,735,647 | B2 | 5/2004 | Boyd et al. |
| 6,757,746 | B2 | 6/2004 | Boucher et al. |
| 6,781,955 | B2 | 8/2004 | Leung |
| 6,832,261 | B1 | 12/2004 | Westbrook et al. |
| 6,879,266 | B1* | 4/2005 | Dye et al. ............ 341/51 |
| 6,888,835 | B2 | 5/2005 | Reeve et al. |
| 6,889,385 | B1* | 5/2005 | Rakib et al. ............ 725/119 |
| 6,904,519 | B2* | 6/2005 | Anand et al. ............ 713/100 |
| 6,907,042 | B1 | 6/2005 | Oguchi et al. |
| 6,909,714 | B2* | 6/2005 | Abrol et al. ............ 370/389 |
| 6,912,522 | B2 | 6/2005 | Edgar |
| 6,950,862 | B1* | 9/2005 | Puthiyandyil et al. ....... 709/220 |
| 6,957,346 | B1 | 10/2005 | Kivinen et al. |
| 7,010,727 | B1 | 3/2006 | Stucker |
| 7,017,175 | B2 | 3/2006 | Alao et al. |
| 7,027,443 | B2 | 4/2006 | Nichols et al. |
| 7,116,640 | B2 | 10/2006 | Tasman et al. |
| 7,136,926 | B1 | 11/2006 | Iyer et al. |
| 2001/0032254 | A1* | 10/2001 | Hawkins ............ 709/219 |
| 2001/0038642 | A1* | 11/2001 | Alvarez et al. ............ 370/477 |
| 2001/0054131 | A1* | 12/2001 | Alvarez et al. ............ 711/105 |
| 2002/0009083 | A1 | 1/2002 | Ambe et al. |
| 2002/0009136 | A1* | 1/2002 | Heath ............ 375/240 |
| 2002/0046348 | A1 | 4/2002 | Brustoloni |
| 2002/0078242 | A1* | 6/2002 | Viswanath ............ 709/247 |
| 2002/0083344 | A1 | 6/2002 | Vairavan |
| 2002/0089979 | A1* | 7/2002 | Abdulkader ............ 370/389 |
| 2002/0133534 | A1 | 9/2002 | Forslow et al. |
| 2002/0133598 | A1* | 9/2002 | Strahm et al. ............ 709/228 |
| 2002/0136210 | A1 | 9/2002 | Boden et al. |
| 2002/0138848 | A1* | 9/2002 | Alao et al. ............ 725/109 |
| 2002/0162026 | A1 | 10/2002 | Neuman et al. |
| 2002/0169885 | A1* | 11/2002 | Alao et al. ............ 709/230 |
| 2002/0172164 | A1* | 11/2002 | Chou et al. ............ 370/282 |
| 2003/0007486 | A1 | 1/2003 | March et al. |
| 2003/0012190 | A1* | 1/2003 | Kaku et al. ............ 370/389 |
| 2003/0028606 | A1* | 2/2003 | Koopmans et al. ......... 709/206 |
| 2003/0110296 | A1* | 6/2003 | Kirsch et al. ............ 709/246 |
| 2003/0142823 | A1 | 7/2003 | Swander et al. |
| 2003/0145226 | A1 | 7/2003 | Bruton et al. |
| 2003/0146907 | A1* | 8/2003 | Boals et al. ............ 345/179 |
| 2003/0154399 | A1 | 8/2003 | Zuk et al. |
| 2003/0179713 | A1* | 9/2003 | Fleming ............ 370/252 |
| 2003/0197719 | A1* | 10/2003 | Lincke et al. ............ 345/710 |
| 2003/0233568 | A1 | 12/2003 | Maufer et al. |
| 2003/0233576 | A1 | 12/2003 | Maufer et al. |
| 2004/0030927 | A1 | 2/2004 | Zuk |
| 2004/0114589 | A1 | 6/2004 | Alfieri et al. |
| 2005/0182854 | A1* | 8/2005 | Pinkerton et al. ........... 709/238 |
| 2005/0281288 | A1 | 12/2005 | Banerjee et al. |

FOREIGN PATENT DOCUMENTS

| | | |
|---|---|---|
| WO | WO 99/35799 | 7/1999 |
| WO | WO 00/56034 | 9/2000 |
| WO | WO 01/67258 | 9/2001 |
| WO | WO 01/76191 | 10/2001 |

OTHER PUBLICATIONS

"RE: IPCOMP and IPSEC", Robert Moskowitz, Jun. 4, 1998.*
"Diffie-Hellman key exchange", Wikipedia, 2002.*
"PKCS #3: Diffie-Hellman Kay Agreement Standard", RSA Laboratories Technical Note, Nov. 1, 1993.*
"IPSec Overview Part Four: Internet Key Exchange (IKE)"; Andrew Mason; Cisco Press; Feb. 22, 2002.*
Mogul et al. "Path MTU Discovery" RFC 1191, Nov. 1990.
Internet Protocol, RFC 791, DARPA, Sep. 1981.
Orda et al. "Optimal Packet Fragementation in Computer Networks", Mar. 1994.

* cited by examiner

METHOD FOR COMPRESSED LARGE SEND

FIELD OF THE INVENTION

The present invention relates generally to compression with large block send, and more particularly to offloading Internet Protocol Payload Compression with Large Send to a network level.

BACKGROUND OF THE INVENTION

The Internet remains a growing public network. Many companies rely on communication over the Internet using Internet Protocol (IP) to facilitate their business endeavors. However, public access also comes along with security risks. To address enhancement of security on the Internet, the Internet Engineering Task Force (IETF) proposed Internet Protocol Security (IPSec). IPSec is designed to provide authentication and encryption for communication over insecure networks, such as the Internet. However, once a packet is encrypted it cannot be compressed. Modems with built-in compression, such as V.42 for example, cannot compress an encrypted packet (due to the randomization of the data when it is encrypted), and thus throughput of such modems was slowed. Accordingly, the IETF proposed Internet Protocol Payload Compression (IPComp) to move compression up in the protocol stack, so that it can happen prior to encryption (instead of at the link level, below IP, as in modems).

IPComp allows systems to negotiate a type of compression for exchanging information prior to encryption. Unfortunately, implementations of IPComp require IPSec-capable computers, because IPComp negotiation is performed using the same negotiation protocol as IPSec, namely, Internet Key Exchange (IKE). Even though, IPComp relies on IKE, there is no reason that IPComp cannot be used independently of IPSec, without encrypting and/or authenticating communications. Unfortunately, in the Microsoft Windows Operating System, there is no Application Program Interface (API) for independently off-loading data for IPComp in operating systems (independently of IPSec, that is). Hereinafter, the term API is used to indicate an entire set of programs, definitions, protocols, subroutines, etc. in an interface, as well as indicate any particular program, definition, protocol, subroutine, etc. within an interface.

There is an API for offloading IPSec to an intelligent network interface (sometimes referred to as a "network interface card" or "NIC"). An intelligent NIC is used to do computationally intensive network stack operations rather than using the host's central processing unit (CPU). This frees up the CPU for other activities. For offloading IPSec, IPSec out-of-band data is created at an application level and passed down to a NIC for encryption on a packet-by-packet basis—the IP packet, including IPsec headers in their correct locations in the packet, is given to the intelligent NIC, along with an index (pointer) into the local "Security Association Database", which contains connection-specific data, such as encryption keys and which encryption algorithm is in use for this connection.

At the high side, an amount of data handed down is equivalent to the largest physical packet size (measured in bytes) that a network interface can transmit, also known as the Maximum Transmission Unit (MTU). For example, the MTU for an Ethernet interface payload is 1,500 bytes, less overhead such as IP and TCP headers (typically 20 bytes each in the case of IPv4, or 40 bytes and 20 bytes for IPv6 and TCP, respectively), as well as any options in use. If Ethernet is used, packets of data may be handed down in blocks of about 1,500 bytes each. An additional 14 bytes and 4 bytes are appended to such a packet for an Ethernet header and trailer, respectively, and thus maximum packet size for an Ethernet packet is 1,518 bytes.

In IPSec, an Authentication Header (AH) and/or an Encapsulating Security Payload (ESP) header are optionally inserted in a packet, along with an ESP trailer—containing the Integrity Check Value (ICV)—if ESP-based Authentication has been negotiated for this connection. Additionally, if IPComp is in use, it will insert a Compression Header (CH) between the IPSec AH and/or ESP headers and the remainder of the packet. The addition of one or more of these headers results in adding more bytes to a packet. Continuing the above example for Ethernet, if payload handed down from an application level to a network interface level is 1,460 bytes, such a packet payload may have to be broken up or fragmented for transmission after the extra headers needed by IPSec, or IPSec and IPComp. However, the hope is that with IPComp, the packet payload will be reduced sufficiently to accommodate the additional headers and all of the original payload. Fragmentation should be avoided, if possible, because performance suffers, since fragmented packets will not have maximum payload usage.

An approach to address fragmentation is use of an API for "Large Send Offload" (also known as TCP Segmentation Offload) for the Transmission Control Protocol (TCP). There are Large Send API supports three component features (which can be used independently or together), namely, TCP Segmentation, TCP Checksum computation, and IP Checksum computation. For purposes of clarity, a Large Send API is used to refer to one or more APIs for initiating a Large Send. For Large Send offloads, a network driver is configured to inform a WinSock stack as to an MTU size. So for example, rather than 1,500 bytes for Ethernet, the network driver would indicate an MTU of 64 kilobytes (KB), or a large multiple of the actual packet payload capacity. In response to such configuration information, an application would thus send fewer, larger data blocks to the protocol stack—larger than can fit into the link's MTU.

Continuing the above example, data would be sent down to a NIC in blocks of approximately 64 KB. For a NIC with Large Send capacity, namely an intelligent NIC, a Network Driver Interface Specification (NDIS) layer provides an exemplary IP and TCP header and a pointer to the large block of data to a NIC driver. This driver divides up such data into path MTU-sized blocks, less any overhead, and sends out successive packets until the intelligent NIC has consumed the entire data block. Continuing the above example, if no options are used, overhead comprises TCP and IP headers totaling 40 bytes, so a 64 KB block of data would be divided as 64,000/1,460, resulting in 43 full packets and one "remainder packet". If fragmentation had been necessary, each packet would have ended up as two fragments, for over 80 total packets. Thus, fewer packets are used, because more packets are fully loaded, such as for example approximately 1,460 bytes of data in each packet except perhaps the last packet, which includes however many bytes that remain after transmitting the rest of the data in the large block.

The initial large data block that is passed to the intelligent NIC includes a prototype TCP/IP header that will be used to build the header for each packet that is sent based on this data. Each Large Send packet will have a slightly different TCP and IP header provided by the NIC, derived from the prototype header, because for instance, TCP sequence numbers must be incremented by such MTU-sized blocks, e.g., by 1,460 for each packet, and the TCP checksum will be different for each packet, since it depends on the contents of the packet data.

However the TCP Source and Destination ports will be the same in each derived packet. At the IP layer, the IP Identification field must be different for each unique packet that is sent, and the IP header checksum will be different for each packet as well, if only because the Identification field is different in each derived packet. Additionally, the calculation of the TCP checksum (which covers a 96-bit IP pseudo-header, the TCP header, and all TCP packet data) and the calculation of the IP header checksum (which covers the IP version 4 header but does not depend on packet data) are conventionally offloaded to the NIC driver. However, as noted above, each of the packets shares common information too, such as IP source address and IP destination address, among other common information as is known, for example the initial TTL.

However, APIs for Large Send do not provide support for IPComp. In fact, there is no API that allows an application to request that compression be offloaded to a lower layer entity, such as an NIC or similar component, for Large Send, i.e., there is no compression "on/off switch" for an application (independent of IPSec). Accordingly, it would be desirable and useful to provide IPComp in the context of Large Send offload capability, by enhancing the Large Send capability with the addition of a simultaneous attempt to negotiate compression, which if successful, would enable the Large Send data blocks to be transmitted using fewer packets.

SUMMARY OF THE INVENTION

An aspect of the present invention is a method for communicating application data for a communication session between two computers. A first portion of the application data is sent in an uncompressed form, where the first portion of the application data is provided by dividing a first large block of data into first smaller blocks of data. Protocol data is independently sent for determining whether a compression technology may be used, whereby an agreement for use of the compression technology may be established. A second portion of the application data is sent in a compressed form in response to an agreement to compress. The second portion of the application data is provided by compressing a subsequent large block of data to provide a compressed smaller block of data. The compression may be applied to the whole large block, or to each individual smaller block.

Another aspect of the present invention is a method for compressed Large Send. An intelligent network interface with Large Send and Internet Protocol Payload Compression capabilities is provided. A Large Send Application Protocol Interface (API) is initiated. Processing of uncompressed payload data by the network interface is initiated in response to the Large Send API, and an Internet Key Exchange API is initiated in response to the Large Send API (though the IKE negotiation is not specifically requested by the Large Send API). An Internet Protocol Payload Compression negotiation is initiated through usage of the Internet Key Exchange protocol. In response to successful conclusion of the Internet Protocol Payload Compression negotiation, a portion of the uncompressed payload data is compressed to provide a compressed data portion. The compressed data portion is sectioned to provide compressed data subsections.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE DRAWINGS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
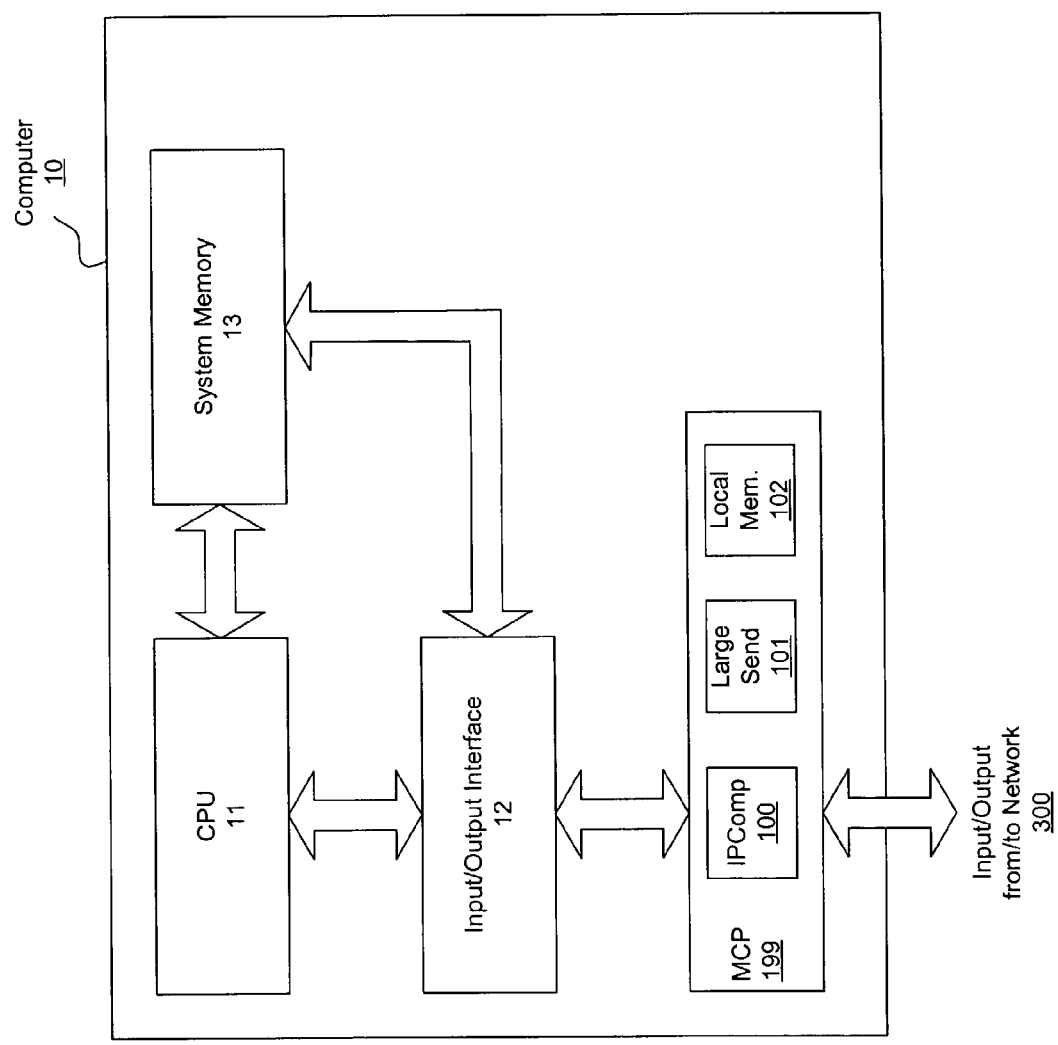
FIG. 1 is a block diagram of an exemplary embodiment of a computer system in accordance with one or more aspects of the present invention.

Referring to FIG. 1, there is shown a block diagram of an exemplary embodiment of a computer system 10 in accordance with one or more aspects of the present invention. Computer system 10 comprises CPU 11, system memory 13, input/output (I/O) interface 12, and nVidia's Media and Communications Processor (MCP) 199 or another intelligent NIC. MCP 199 may be coupled for I/O from/to a network 300. MCP 199 is an intelligent NIC, and thus supports Large Send capability 101, as indicated. Additionally, MCP 199 supports IPComp capability 100. Though IPComp capability 100 may be embodied in software to be executed by CPU 11, this would reduce a performance advantage gained by offloading IPComp to MCP 199.

Figure 2:
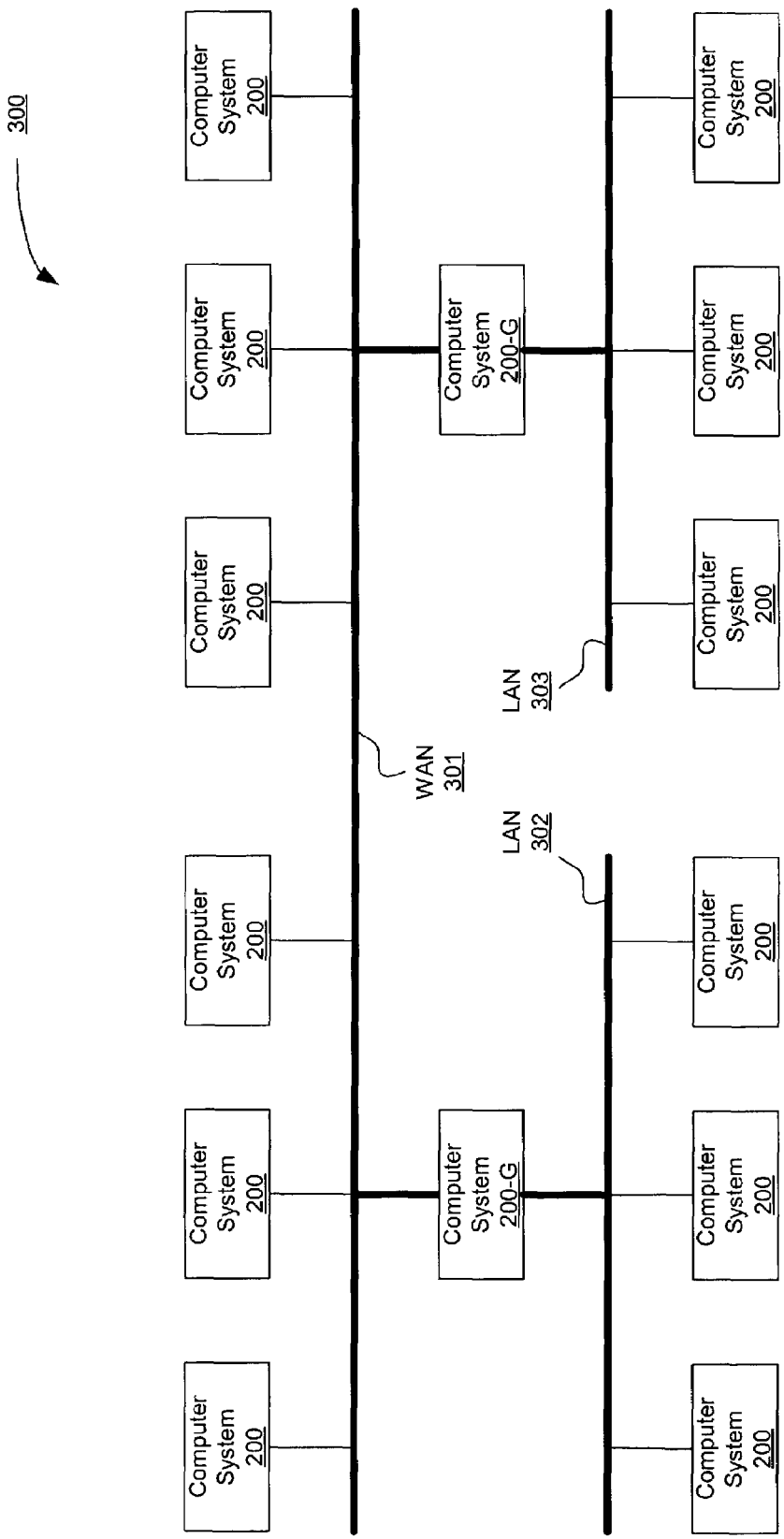
FIG. 2 is a block diagram of an exemplary embodiment of a network in accordance with one or more aspects of the present invention.

Referring to FIG. 2, there is shown a block diagram of an exemplary embodiment of a network 300 in accordance with one or more aspects of the present invention. Network 300 comprises computer systems 200 coupled to one another via WAN 301 and LANs 302 and 303. Notably, computer systems 200-G serve as gateways for LANs 302 and 303. However, two computers may be in communication with one another without a LAN, such as two computers communicating with one another directly over the Internet. Notably, it is not necessary that a receiving computer have an intelligent NIC.

Figure 3:
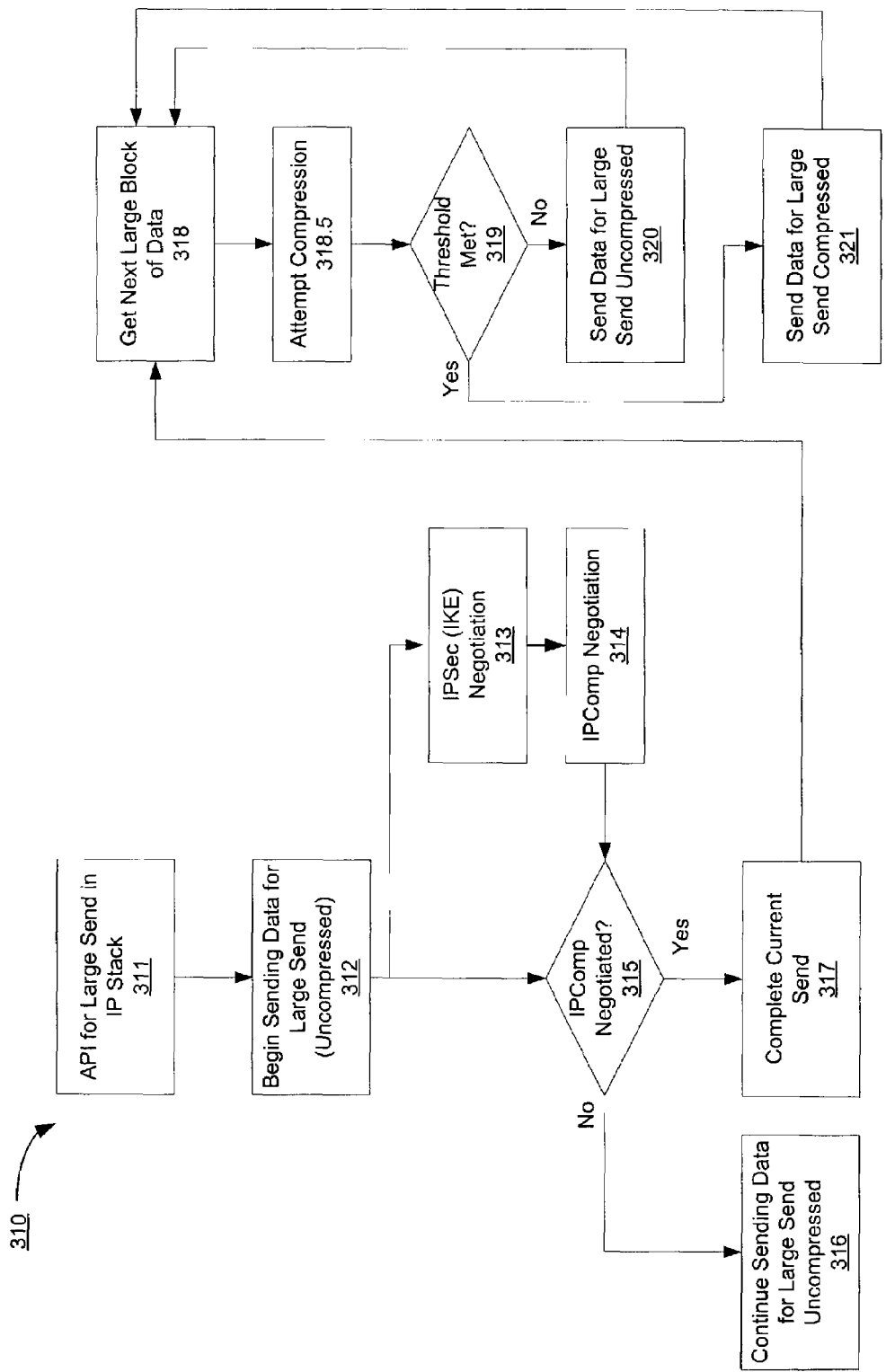
FIG. 3 is a process flow diagram for an exemplary embodiment of a communication process between two or more computer systems in accordance with one or more aspects of the present invention.

In FIG. 3, there is shown a process flow diagram for an exemplary embodiment of a communication process 310 between two or more computer systems, where the sending computer system comprises a MCP 199 shown in FIG. 1 in accordance with one or more aspects of the present invention. At step 311, a Large Send API is instantiated in an IP stack. An API, such as a Windows API for Large Send, may be used. Thus, continuing the above example, large data blocks of approximately 64 KB will be sent from an application layer to a network layer in a protocol stack. Accordingly, a network driver for MCP 199, having Large Send capability, breaks such blocks up into MTU sized blocks, such as approximately 1.5 KB each, for transmission. Initiation of a Large Send API is used to start sending data in a conventional manner at step 312. Transmission of data at this point is still in an uncompressed format. The Large Send API may be modified to use even lager data blocks.

Initiation of such a Large Send API is also used to initiate at step 313 an IPSec packet for IKE negotiation using an IPSec API. Such an IKE packet may be sent interleaved or pipelined with data being sent for the Large Send. Notably, IPSec negotiation must result in an agreement to do authentication and/or encryption, otherwise data may not be sent. Rather, IPSec negotiation is used to enable access to IPComp negotiation with a receiving computer.

At step 314, IPComp negotiation takes place. Again, IPComp capability 100 may be part of MCP 199 or part of application software. Notably, if IPComp negotiation can be accessed without first enabling IPSec negotiation, step 313 may be omitted, and a Large Send request to MCP 199 may be used to trigger IPComp capability 100. Step 312 can proceed in an interleaved manner (essentially, in parallel) with step 313 and/or step 314, so these steps should not be regarded as sequentially related. Notably, IPComp capability 100 may be embodied in hardware and/or firmware of MCP 199. Also, because MCP 199 has IPComp capability, IPComp may be transparently done with respect to an operating system of a sending computer other than initiation of a Large Send API.

At step 315, a check is made to determine if IPComp negotiation resulted in an agreement to compress using an agreed upon compression algorithm. If IPComp negotiation is unsuccessful, data continues to be sent in an uncompressed form, as indicated at step 316.

However, if IPComp negotiation is successful, namely, a compression algorithm is agreed upon between a sending computer and at least one receiving computer, then a data compression mode will be used. Notably, multicasting may be used with a compressed Large Send as described herein. For multicasting, agreement between a sending computer and receiving computers for compression is needed, and thus transmission of data, whether uncompressed or compressed, is to such receiving computers.

Optionally, at step 317, a block of data currently being processed after IPComp negotiation is completed may be sent in an uncompressed manner. A conventional Compression Parameter Index (CPI) is provided as part of the IPComp Compression Header, or CH. Nicely, a receiving computer in receipt of a packet without a CPI will simply process received data as uncompressed.

At step 318, a next large block of data is obtained. Because larger blocks of data, such as 64 KB blocks, may be compressed, compression efficiency is improved over compressing smaller blocks of data, such as 1.5 KB blocks. If block-level compression is not negotiated, packet-by-packet compression may also be used, with slightly worse efficiency. Since better compression ratios conventionally are achieved when applying a compression algorithm to a larger block of data, use of Large Send in combination with block-level compression would be advantageous. Thus, continuing the above example, a 64K block may be compressed down to 48K to 54K for example prior to dividing into 1.5K blocks for transmission, where approximately each 1.5 KB reduction is one less packet to be transmitted. Notably, by using compression, fewer packets may be used to send data to enhance system performance and reduce transmission bandwidth consumption.

However, it is possible that a block of data is not very compressible, so an optional threshold check at step 319 is used. If compression of a block of data is not reduced by at least a certain threshold percentage, then MCP 199 may avoid compression to avoid a performance penalty for decompression by a receiving computer. For example, a compression result of approximately 3% or less reduction in size, such as from 64K down to about 60K or more, may be insufficient to merit compression. If a compressibility threshold is not met, such a block is not sent in compressed form; rather, conventional Large Send processing takes place on such a block at step 320.

However, if a compressibility threshold is met at step 319, then at step 321 MCP 199 inserts an IPComp Compression Header for transmitting IPComp-compressed packets, as well as modifying other packet related information. When MCP 199 receives an IP packet for transmission, and when IPComp is in effect for that transmission flow, the IP header must be modified. As mentioned above, an IPComp header is inserted, also IPv4 Length and IPv6 Payload Length fields may no longer be correct so they will have to be modified, and an IPv4 header checksum will need to be re-calculated (for the final packet, intermediate packets will retain their original length, by inserting the Compression Header and then taking fewer bytes of compressed data to compensate for the additional bytes consumed by the IPComp header—resulting in a packet that is the same size as one that would be sent by Large Send without IPComp). IPComp is compatible with both IPv4 and IPv6, so modifications to such headers are similar. For IPv4, a Total Length field is changed to reflect a change in length of an IP packet, including IP header, inserted IPComp header, and length of compressed payload. In IPv6, a Payload Length field is modified to reflect length of compressed data in addition to an inserted IPComp header. An IPv4 Protocol field or an IPv6 Next Header field, as applicable, is changed from an old value to a value that indicates the presence of the Compression Header. The old value is remembered for use in an inserted IPComp header. When necessary, an IPv4 header checksum is calculated.

A receiving computer must be able to remove such IPComp header. To avoid fragmentation, a known number of bytes are held in reserve. For example, an IPComp header is 4 bytes, so payload compression must reserve 4 bytes per Large Send to ensure such an IPComp header is not fragmented from such a Large Send. A CPI field is used along with an IP Destination Address field to identify a compression algorithm in use. As stated above, it is possible to use IKE to negotiate compression associations, namely, agreement on a compression algorithm, independent of IPSec. Alternatively, negotiation between two or more IP endpoints or network nodes of a CPI value, and thus an associated compression transform for such endpoints, may ride upon an existing IKE session being used for IPSec Security Association (SA) negotiations between such endpoints. As is known, CPI values of 0-63 are reserved for well-known compression algorithms, of which values 0-4 have been allocated as set forth in Table I. Notably, IPComp does not mandate a default compression algorithm or transform. Thus, if two IPComp-capable nodes do not have at least one common transform, they will not be able to exchange compressed data using IPComp.

TABLE I

| Transform Identification | Value |
| --- | --- |
| RESERVED | 0 |
| IPCOMP_OUI | 1 |
| IPCOMP_DEFLATE | 2 |
| IPCOMP_LZS | 3 |
| IPCOMP_LZJH (V.44) | 4 |

Moreover, as MCP 199 is configured to do compression, CPU time is not consumed for compressing data at step 321.

Furthermore, Large Send capability may be combined with multicasting capability of MCP 199 for doing a multicast Large Send with compressed data at step 321.

Some embodiments of the present invention are program products that may reside in whole or in part in local memory 102 of MCP 199 and/or system memory 13. By way of example and not limitation, memory may be sufficient to hold at least a portion of communication process 310 in accordance with one or more embodiments of the present invention. Memory may comprise volatile and/or non-volatile memory, including but not limited to magnetically readable memory (e.g., floppy disk, hard disk, and the like), optically readable memory (e.g., CD-ROM, -RW, DVD-ROM, -RAM, and the like), and electrically readable memory (e.g., DRAM, SRAM, EEPROM, registers, latches, and the like). Accordingly, some embodiments of the invention are program products containing machine-readable programs. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

It should be appreciated that within a communication session data may be converted from being sent in an uncompressed form to being sent in a compressed form and vice versa within the middle of such a communication session. Because IPComp negotiation is conducted in parallel with the transmission of data, latency of data transmission is reduced as compared with IPSec wherein agreement must be completed first prior to sending data in an encrypted form. Moreover, it should be appreciated that a NIC in a sending computer of communicating computers combines Large Send and compression without need for operating system intervention and without need for CPU usage. Offloading compression of large blocks to a NIC is a significant performance enhancement (due to further reduction in CPU utilization) in addition to having to send fewer packets.

While foregoing is directed to the preferred embodiment of the present invention, other and further embodiments of the invention may be devised without departing from the basic scope thereof, and the scope thereof is determined by the claims that follow. All trademarks are the respective property of their owners. Claims listing steps do not imply any order of the steps.

The invention claimed is:

1. A method for communicating payload data utilizing Internet Protocol Security (IPSec) and Internet Protocol Compression (IPComp) within a communication session between a first computer and a second computer independent of operating system intervention, the method comprising:

sending a first portion of the payload data in an uncompressed form from the first computer to the second computer, the first portion of the payload data provided by:
obtaining a first block of the payload data, and
dividing the first block into blocks of uncompressed data, wherein each of the blocks of uncompressed data is transmitted during the communication session;
simultaneously with sending the first portion of the payload data, independently sending protocol data from the first computer to the second computer for determining whether IPComp negotiation between the first computer and the second computer resulted in an agreement to compress subsequent data using an agreed upon compression algorithm;
if IPComp negotiation is successful, then:
establishing an agreement between the first computer and the second computer to transmit data using a data compression mode, and
sending a second portion of the payload data in the compressed form from the first computer to the second computer, wherein the second portion of the payload data comprises a data size that is at least a multiple of an Internet Protocol (IP) packet capacity, and the second portion of the payload data being provided by:
obtaining a second block of the payload data,
compressing the second block of the payload data according to the IPComp to provide compressed data block, wherein the compressed second block is smaller in data size relative to the second block,
dividing the compressed second block into smaller blocks of compressed data, wherein each of the smaller blocks of compressed data comprises a data size within the IP packet capacity and is transmitted during the communication session,
applying the IPSec to each of the smaller blocks of compressed data, and
transmitting the smaller blocks of compressed data to the second computer without the operating system intervening; and
if IPComp negotiation is unsuccessful, then transmitting the payload data in an uncompressed form.

2. The method of claim 1, further comprising checking the compressibility of the second block of the payload data to determine whether the second block of the payload data meets a compressibility threshold to avoid compressing data where a performance penalty would be incurred.

3. The method of claim 1, wherein the first portion of the payload data is either interleaved or pipelined with the protocol data.

4. The method of claim 1, wherein the sending of the protocol data is done independently of any operating system associated with the first computer and the second computer.

5. The method of claim 1, wherein the first portion of the payload data and the second portion of the payload data are respective portions of a Large Send.

6. The method of claim 1, wherein the protocol data comprises negotiation protocol information.

7. The method of claim 1, wherein the payload data comprises application data.

8. The method of claim 5, wherein the steps of sending the first portion of the payload data and the second portion of the payload data comprise multicasting the first portion of the payload data and the second portion of the payload data.

9. The method of claim 6, wherein the negotiation protocol information comprises Internet Protocol Security packet for Internet Key Exchange negotiation.

10. Computer-readable storage medium storing instructions that, when executed by processor, cause a computer system to communicate payload data utilizing Internet Protocol Security (IPSec) and Internet Protocol Compression (IPComp) within a communication session between a first computer and a second computer independent of operating system intervention, by performing the steps of:

sending a first portion of the payload data in an uncompressed form from the first computer to the second computer, the first portion of the payload data provided by:

obtaining a first block of the payload data, and dividing the first block into blocks of uncompressed data, wherein each of the blocks of uncompressed data is transmitted during the communication session;

simultaneously with sending the first portion of the payload data, independently sending protocol data from the first computer to the second computer for determining whether IPComp negotiation between the first computer and the second computer resulted in an agreement to compress subsequent data using an agreed upon compression algorithm;

if IPComp negotiation is successful, then:

establishing an agreement between the first computer and the second computer to transmit data using a data compression mode, and sending a second portion of the payload data in the compressed form from the first computer to the second computer, wherein the second portion of the payload data comprises a data size that is at least a multiple of an Internet Protocol (IP) packet capacity, and the second portion of the payload data being provided by:

obtaining a second block of the payload data, compressing the second block of the payload data according to the IPComp to provide compressed data block, wherein the compressed second block is smaller in data size relative to the second block, dividing the compressed second block into smaller blocks of compressed data, wherein each of the smaller blocks of compressed data comprises a data size within the IP packet capacity and is transmitted during the communication session, applying the IPSec to each of the smaller blocks of compressed data, and transmitting the smaller blocks of compressed data to the second computer without the operating system intervening; and if IPComp negotiation is unsuccessful, then transmitting the payload data in an uncompressed form.

11. The computer-readable storage medium of claim 10, wherein the sending of the first portion of the payload data is interleaved with the sending of the protocol data.

12. The computer-readable storage medium of claim 10, wherein the sending of the protocol data is done independently of any operating system associated with the processor.

13. The computer-readable storage medium of claim 10, wherein the protocol data comprises negotiation protocol information.

14. The computer-readable storage medium of claim 10, wherein the payload data comprises application data.

15. The computer-readable storage medium of claim 10, wherein the sending of the first portion of the payload data is pipelined with the sending of the protocol data.

16. The computer-readable storage medium of claim 13, wherein the negotiation protocol information comprises Internet Protocol Security packet for Internet Key Exchange negotiation.

* * * * *